(12) United States Patent
Smiley

(10) Patent No.: US 6,402,445 B1
(45) Date of Patent: Jun. 11, 2002

(54) AUTOMATIC BOAT-TO-TRAILER CONNECTION APPARATUS

(76) Inventor: Mark T. Smiley, 25 Cape Horn, Cleveland, MN (US) 56017

( * ) Notice: Subject to any disclaimer, the term of this patent is extended or adjusted under 35 U.S.C. 154(b) by 0 days.

(21) Appl. No.: 09/686,202

(22) Filed: Oct. 10, 2000

(51) Int. Cl.$^7$ ................................................. B60P 7/08
(52) U.S. Cl. .............................. 410/77; 410/2; 410/69; 410/80; 280/414.1
(58) Field of Search .............................. 410/2, 3, 7, 69, 410/77, 80, 81; 280/414.1, 508; 114/344.1; 414/536; 292/341.15, 341.17

(56) References Cited

U.S. PATENT DOCUMENTS

| | | |
|---|---|---|
| 3,632,138 A | 1/1972 | Whitely, Jr. |
| 3,750,805 A | 8/1973 | Finney |
| 3,938,829 A | 2/1976 | Anderson |
| 4,641,851 A | 2/1987 | Kneis |
| 4,995,629 A | 2/1991 | Poppell |
| 5,599,035 A * | 2/1997 | Spence ...................... 410/77 X |
| 5,666,901 A | 9/1997 | Jones |
| 5,683,214 A | 11/1997 | Jeffreys |
| 5,690,042 A | 11/1997 | Bentley |
| 5,795,115 A * | 8/1998 | Collins ........................ 410/22 |
| 5,876,166 A * | 3/1999 | Hyslop ........................ 410/77 |
| 5,879,114 A | 3/1999 | Spence |
| 5,895,185 A | 4/1999 | Spence |
| 5,941,551 A | 8/1999 | Harman et al. |

* cited by examiner

Primary Examiner—Stephen T. Gordon
(74) Attorney, Agent, or Firm—Roger W. Jensen

(57) ABSTRACT

The invention includes an elongated frame member connectable to the eyebolt at the bow of a boat. A pair of brackets, are respectively connected to upper and lower ends of the frame member. One of the brackets supports a transversely extending rod receiving socket, and the other bracket supports a transversely oriented rod journal bearing, the socket and the journal bearing having the same longitudinal axis. An elongated rod member is slidably positioned in the journal bearing and has at the lower end thereof a locking element which is adapted to selectively co-act with either the journal bearing or the socket. A rod receiver member is connectable to the forward end of a trailer and includes a pair of spaced apart, longitudinally extending brackets defining therebetween a rod receiving pocket and having end portions flared in opposite senses to as to define a relatively wide rod receiving yoke. A latch member is pivotally mounted on one of said flared end portions and is spring biased to a first position whereat it straddles the spaced apart brackets and closes off the rod receiving pocket. The latch member is adapted to be rotatably displaced by the rod member upon contact therewith, so as to permit the rod member to enter the pocket, following which the latch is spring biased back to the first position, thereby capturing the rod member in the pocket.

10 Claims, 3 Drawing Sheets

AUTOMATIC BOAT-TO-TRAILER CONNECTION APPARATUS

BACKGROUND OF THE INVENTION

This invention relates to boats and to trailers for transporting the boats. More specifically, this invention relates to an automatic boat-to-trailer connection apparatus for attaching and holding a trailered boat to the receiving trailer.

The use of trailers for transporting, launching, or retrieving boats is widely used by the boating public. Most commercially available boat trailers utilize a combination of a winch and tow rope for retrieving boats from the water onto a boat trailer. The major disadvantage and problem with the use of a winch and tow rope is that at least two people are required to effectively retrieve and load the boat. One person is normally needed to connect the tow line to the boat and operate the winch. The other person is required to navigate and maintain the boat in alignment with the boat trailer.

There are two major problems associated with this prior art technique. Situations frequently arise where there is a strong cross or transverse wind and/or rough or turbulent waters. In these cases, the alignment of the boat with the trailer, as well as the attachment of the tow line to the boat, becomes extremely difficult and precarious. Second, the operation or winding of the winch can be dangerous; the winch may malfunction and/or the tow line may break or part, staging a dangerous scenario for the winch operator.

There are a number of prior art patents relating to trailer-latching devices, but they all have one or more significant disadvantages as compared to the present invention.

SUMMARY OF THE INVENTION

The present invention provides a boat trailer latching device which is simple in mechanical construction and operation, and which requires the use of only one person, even when the retrieval of the boat is attempted under adverse conditions of wind and/or water conditions.

The invention provides an apparatus for automatically securing a boat equipped with a standard eyebolt at the bow thereof to a boat-transporter type trailer positioned partially in the water, and having the forward end thereof out of the water. The invention comprises an elongated frame member having a pair of spaced apart portions joined at upper and lower ends thereof, as well as a central portion. The frame member is connectable to the bow of the boat by a removable means, such as a bolt connected to the central portion and through the eyebolt. The frame member further includes a pair of Y-shaped members attached respectively to the two ends of the frame member, and extending to be engageable with the bow of the boat. The frame member further comprises a bracket connected to and extending longitudinally from the lower end and including at an end thereof a transversely-extending rod receiving socket. A second bracket is connected to and extending longitudinally from the upper end of the frame member, and includes at an end thereof a transversely oriented rod journal means. The apparatus further comprises an elongated rod member slidably positioned in the rod journal means and having upper and lower ends with a handle means on the upper end, and a locking means element on the lower end. The rod member is positioned in the rod journal means for longitudinal movement so as to be positioned either in a down position whereat the locking means element is engaged with the rod receiving socket, or in an up position whereat the locking means element is engaged with the rod journal means.

A rod receiver member is connectable to the forward end of the trailer and includes a base portion and a pair of spaced apart longitudinally extending brackets defining therebetween a rod receiving pocket and having end portions flared in opposite senses, so as to define a relatively wide rod receiving yoke. A latch member is pivotally mounted on one of the flared end portions. The latch member may be rotatably displaced by contact therewith by said rod member to permit the rod member to enter into the pocket following which the latch is spring biased back to the first position, thereby capturing the rod member in the pocket and thus attaching the boat to the trailer.

DETAILED DESCRIPTION OF THE INVENTION

Figure 1:
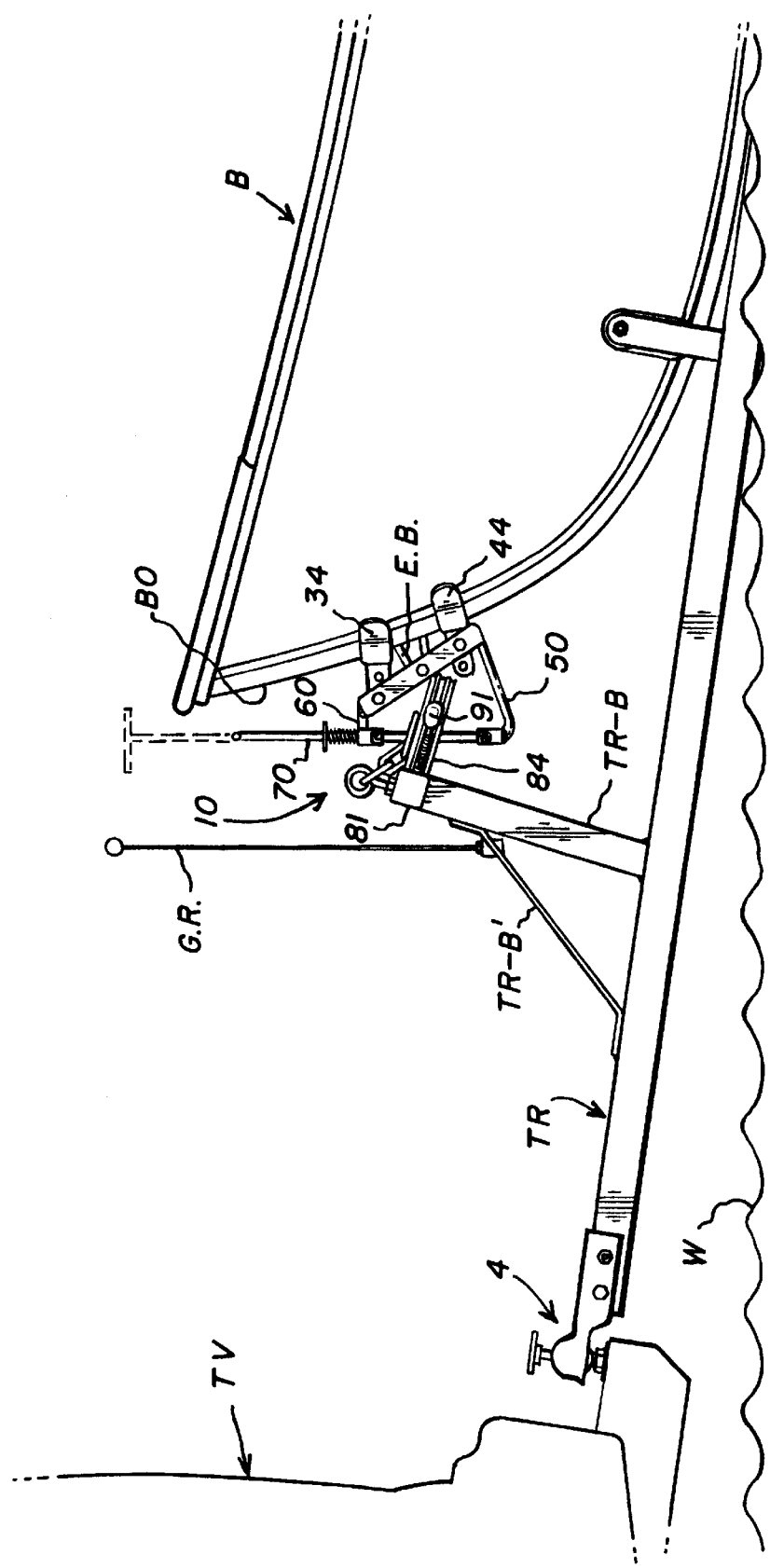
FIG. 1 is a showing of a trailer TR connected to a tow vehicle TV, the front portion of the trailer being shown out of the water, whereas the remainder of the trailer (not shown) would be under the water to permit the approachment of a boat B onto the trailer.

FIG. 1 depicts the subject invention 10 as connected to a trailer TR adapted to be connected by a hitch 4 to a towing vehicle TV in a convention manner and to a boat B having a bow BO and front portion 130 supported on the trailer. A conventional eyebolt EB is provided on the bow. In FIG. 1, only the forward portions of the trailer TR and boat B are depicted. The forward or front of the trailer TR is shown being above the top of the water surface W. Trailer TR is intended to be one of the numerous commercially available models that are adapted to be backed on wheels (not shown) down a ramp by the towing vehicle TV. The trailer is backed down the ramp a sufficient distance so as to provide adequate water depth to permit the boat B to be brought in to and above the trailer for attachment thereto, and for subsequent removal from the water.

The trailer TR has a generally transversely extending bracket TR-B which is augmented and strengthened by an auxiliary brace TR-B'. As will be explained below, at the top (as shown in FIG. 1) of bracket TR-B is attached a base portion 81 of a rod receiver member 80.

Figure 2:
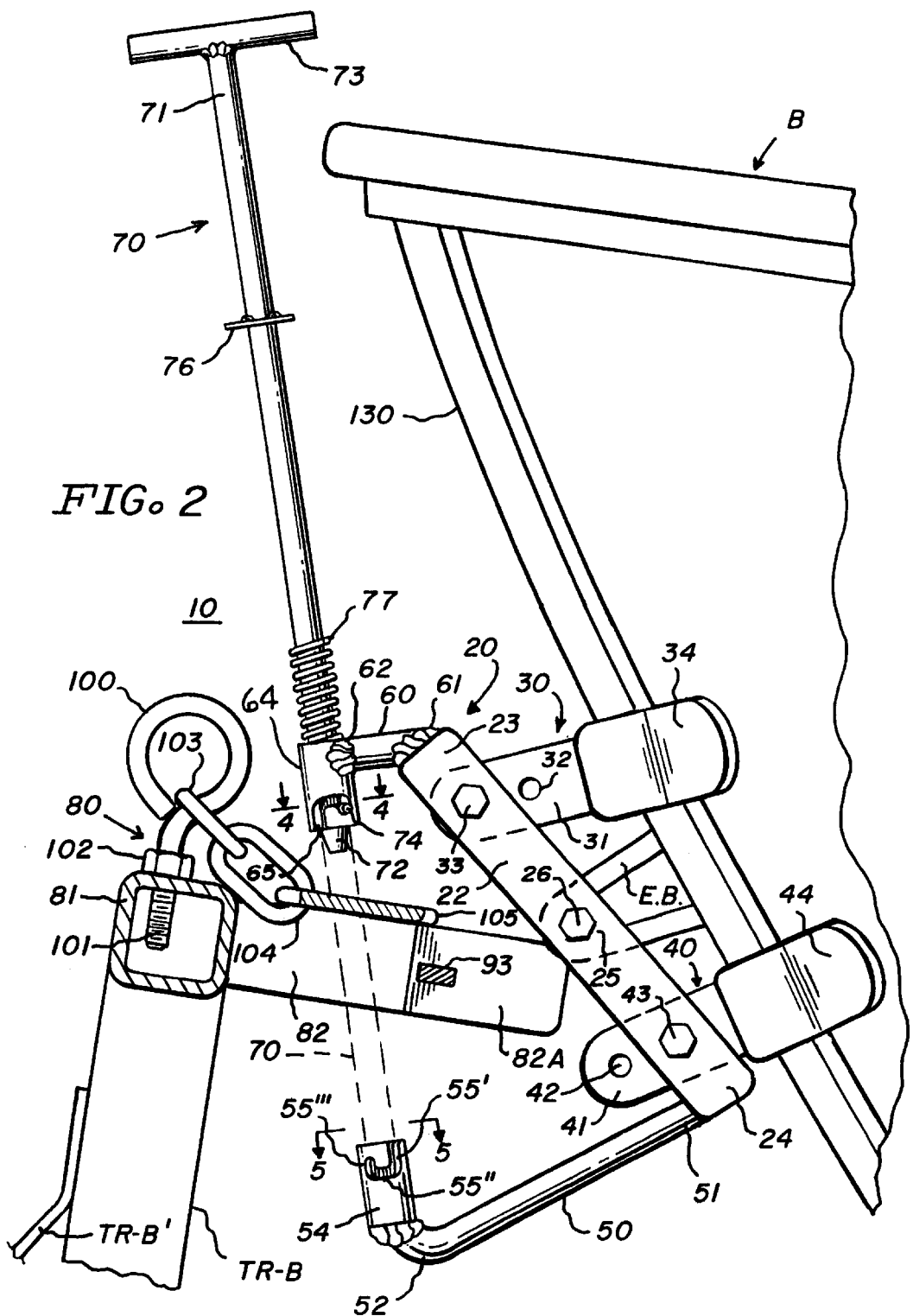
FIG. 2 is an enlarged view of the apparatus attached to the boat and to the trailer, as is generally viewed along section lines 2—2 of FIG. 3.
Figure 3:
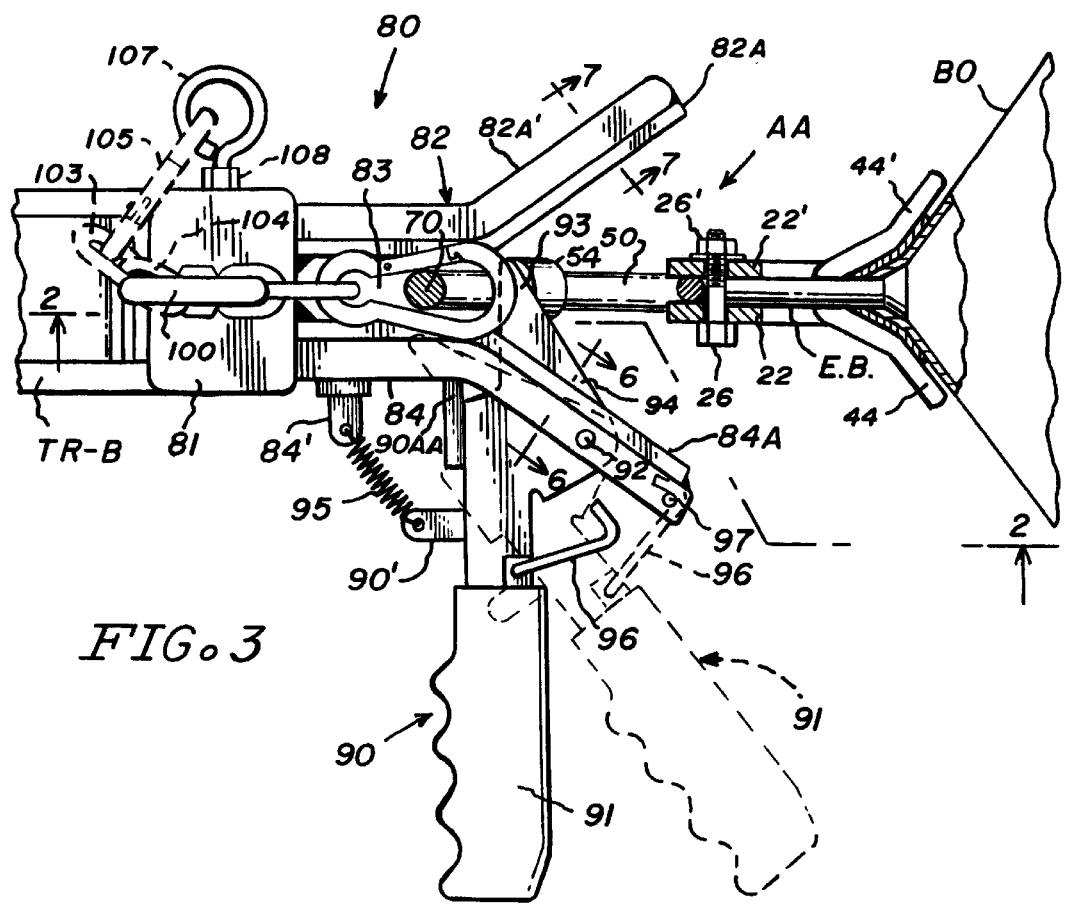
FIG. 3 is a top view of the apparatus shown in FIG. 2.
Figure 4:
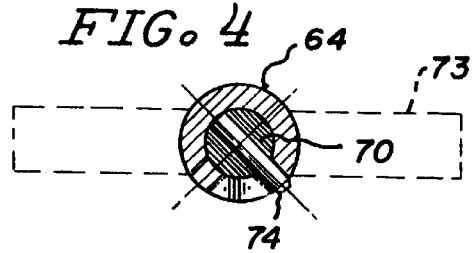
FIG. 4 is a cross-sectional view of the flat journal means 64 and rod 70 with locking means element 74 as viewed along section lines 4—4 of FIG. 2.

A key component of the subject invention is depicted in FIGS. 2 and 3, i.e., an elongated frame member 20 having a pair of spaced apart portions 22 and 22' (see FIG. 3) joined at upper and lower ends 23 and 24 respectively, as well as a central portion 25. The frame member 20 is connectable to the bow by a removable means adapted to be connected to the eyebolt EB of the boat. More specifically, the removable means is depicted as a bolt 26 positioned in suitable apertures or bores in the spaced apart portions 22 and 22', and also passing through the eyebolt EB, a nut 26' shown in FIG.

3 being attached to the threaded end of bolt 26 so as to securely hold the frame member 20 to the bow of the boat.

The frame member 20 further includes a pair of Y-shaped members 30 and 40, attached respectively to the upper and lower ends 23 and 24 of the frame member 20. The Y-shaped members 30 and 40 have stem portions respectively identified by reference numerals 31 and 41, connected at one end thereof with a pair of padded diverging legs. More specifically, the stem 41 of Y-shaped member 40 has diverging legs 44 and 44', shown clearly in FIG. 3. Leg 44 is shown in FIG. 2. The stem 31 is depicted in FIG. 2 with one of its two diverging legs 34.

To provide adjustability to fit a variety of boat configurations, the stems 31 and 41 each have a pair of bores therethrough for receiving a connecting bolt. More specifically, stem 31 has a pair of bores 32, and stem 41 has a pair of bores 42. Bolts 33 and 43 respectively are positioned in selected bores 32 and 42, and nuts (not shown) are attached to the threaded ends of the bolts 33 and 43. It will be understood that this arrangement provides flexibility and adaptability of the frame member to various bow angles of various boats.

Figure 5:
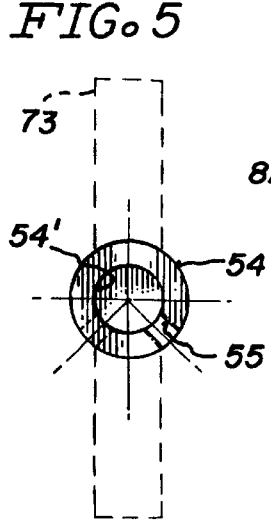
FIG. 5 is a cross-sectional view of rod receiving socket 54 as viewed along section lines 5—5 of FIG. 2.

The frame member 20 further comprises a bracket 50 having a first end 51 connected to and extending generally longitudinally from the lower end 24 of the frame member, and has at a second end 52 thereof a transversely extending rod receiving socket 54. An end view of socket 54 is also shown in FIG. 5. Socket 54 has an inner bore 54' and a locking slot 55 having the shape of a "J" with portions 55', 55", and 55'", shown clearly in FIG. 2.

A second bracket member or means 60 is connected at 61 to the upper end of frame 20 and extends generally longitudinally from the upper end 23; bracket 60 has at its other end 62 a connection to a transversely oriented rod journal means 64, the longitudinal axis of which is in alignment with the longitudinal axis of the socket 54.

As shown in FIG. 2, the journal 64 has locking slot 65 having an inverted "J" shape, otherwise essentially identical to the locking slot in socket 54.

An elongated rod member 70 is slidably positioned in the rod journal means 64 and has upper and lower ends 71 and 72, respectively. A handle 73 is provided at end 71 of the rod and a locking means element 74, in the form of a pin, is provided at the rod lower end 72 as is shown in FIG. 2.

Rod 70 further includes a radially extending shoulder or spring retainer 76, as well as a coaxial coil compression spring 77 which is positioned between shoulder 76 and the upper end of journal 64.

As shown in FIG. 2, the rod 70 is in an upper or open position where it is held by the pin engaging the locking slot 65 of journal 64. In FIG. 1 the rod 70 is shown in the down or closed position, whereat the pin 74 is in register with portion 55'" of the "J"-shaped slot 55. In this mode the compression spring 77 is compressed between the top end of journal 64 and the shoulder 76.

Thus, the frame member with the above-identified apparatus, including handle 70, would be attached to the boat at all times. When it was desired to have the boat approach the trailer so as to attach the boat to the trailer, then the handle 70 would be in the down position as is shown in FIG. 1 with the pin 74 engaging the "J"-shaped slot 55 in the socket 54 as described.

Figure 7:
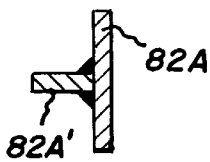
FIG. 7 is a cross-section of bracket 82 as viewed along section lines 7—7 of FIG. 3.
Figure 6:
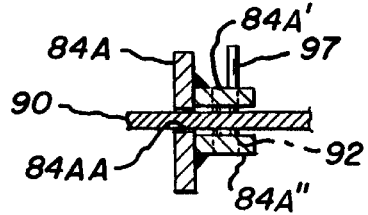
FIG. 6 is a cross-section of bracket 84 as viewed along section lines 6—6 of FIG. 3.

The invention further includes a rod receiver means or member identified by reference numeral 80 in FIGS. 2 and 3 comprising, as briefly described above, a base member 81 firmly attached, as by welding, to the top of trailer bracket TR-B. Base member 81 may be solid metal or may be hollow as depicted in FIG. 2; the main requirement is that base 81 should be sufficiently strong and ruggedized so as to handle the loads imposed upon it. The rod receiver member 80 further comprises a pair of spaced apart, longitudinally extending brackets 82 and 84. As shown, brackets 82 and 84 extend generally parallel to one another, but spaced apart so as to define therebetween a rod receiving pocket 83. The brackets 82 and 84 are flared at the ends thereof in opposite senses, as identified by reference numerals 82A and 84A, so as to define a relatively wide receiving yoke AA. FIGS. 6 and 7 respectively show cross-sections of brackets 84 and 82. Bracket 82 has a main structural element 82A with a lateral or transverse strengthening rib 82A'. Bracket 84 is more complex; as shown in FIG. 6, the vertical portion 84A is strengthened by a pair of spaced apart ribs 84A' and 84A", the spacing therebetween matching and being in register with a slot 84AA which extends a substantial portion longitudinally of the bracket 84, but does not extend all the way to the ends thereof.

A latch member 90 is rotatably mounted on bracket 84 and is positioned in slot 84AA, a pivotal connection including a pin 92 being shown clearly in FIG. 6. The latch 90 is shown, in plan view, in FIG. 3 and comprises a flat-like member having at one end thereof a handle 91. The top end, as shown in FIG. 3, includes a sloped edge 94 which terminates at a tip 93. A stop means 90AA is attached to the latch 90 and serves to limit the clockwise rotation of latch 90 as shown in FIG. 3 to the position shown in FIG. 3. A tension spring means 95 is connected through a projection 84' of bracket 84 and, at the other end thereof to a projection 90' of the latch 90. The function of the spring 95 is to bias the latch 90 to the position shown in FIG. 3.

An optional safety chain means is provided and comprises an eyebolt means 100 attached to base means 81 connected in any suitable manner such as is illustrated in FIG. 2 by a threaded end 101 thereof being screwed into the base 81 and held in place by a lock nut 102. Attached to eyebolt 100 are a plurality of links 103 and 104 and, finally, a link 105 which may have detaching means. The safety chain is shown in FIGS. 2 and 3 positioned with link 105 encompassing rod 70. FIG. 3 further shows an alternate securing positioning of the safety chain (with the lead lines for links 103, 104, and 105 being dotted) and with detachable link 105 engaging an auxiliary eyebolt 107, and associated lock nut 108.

The latch means 90 may be rotated counterclockwise as shown in FIG. 3 to the dotted line position. The latch may be momentarily moved to this position upon the impact of the rod 70 striking the sloped surface 93 of the latch, thus causing the latch to pivot about pin 92 momentarily counterclockwise, following which the latch would return under the biasing force of spring 95 to the position shown in FIG. 3.

There may be a scenario where the boat may be manually brought towards the trailer and onto the trailer by a person from the shore, i.e., not in the boat. For this situation, the latch 90 may be rotated to the dotted line position shown in FIG. 3 and held in this position through an auxiliary holding means 96 which is pivotally attached to the latch 90 adjacent the handle 91 and which is adapted to engage a small pin 97 positioned on the outer end of bracket 84. For this mode of operation, the boat may be floated on and over the trailer and moved longitudinally sufficiently so that the elongated rod 70 (in the down position) is moved beyond the guide rod receiving yoke AA and into the pocket 83, at which point the member 96 may be disengaged from pin 97 so as to allow the latch 90 to return to the full line position shown in FIG. 3. The tip 93 of the latch 90 substantially closes off the pocket 83, and thus prevents the rod 70 from leaving the pocket 83.

OPERATION

As described above, the invention is utilized by having the elongated frame member 20 and its associated parts including rod 70, journal 64 and socket 54 attached to the boat in the above-described manner, i.e., by being connected to the eyebolt EB. Concurrently, the rod receiver member 80 is attached to the trailer bracket TR-B with latch 90 being shown in the full line position in FIG. 3. The trailer TR is positioned as shown in FIG. 1. The trailer may include a guide rod GR which could serve as an aiming point for the boat operator for bringing the boat in under power to the trailer. The boat operator controls the 5 boat so as to approach the trailer with the bow center line being substantially lined up with the trailer center line which is designated by the guide rod GR as the boat (with the appropriate forward movement) approaches and goes on top of trailer being supported buoyantly by the water. The rod 70 is in the down position as shown in FIG. 1, with the rod locking element or pin 55''' being in register with portion 74 of socket 54. As the boat continues to approach the trailer, the rod 70 will strike the sloped surface of latch 90, causing it to be moved, momentarily, to the dotted line position shown in FIG. 3, thus permitting the rod 70 to enter into the throat of pocket 83, following which the latch will be disengaged from the rod 70, thus permitting the latch 90 under the biasing action of spring 95 to be moved to the solid line position shown in FIG. 3.

When the boat is to be launched from the trailer into the water, the rod 70 is raised to the up position depicted in FIG. 2; this can be done by a person on land or in the boat. As the trailer backs into sufficiently deep water, the boat will float and disengage the trailer.

One of the advantages of the invention is that when the rod 70 makes contact with the latch 90, there is a significant noise, so as to be audible to the boat operator, i.e., and advisory that the boat is now tethered to the trailer.

While FIG. 1 shows the rod 70 in the down position to be out of sight of the boat operator, it will be understood that by choice, the rod 70 could be made longer so that even for this case, the top of the rod or the handle 73 would be visible to the boat operator, even when the end 72 thereof is in the socket 54; this could be advantageous in giving the boat operator a site, or aiming device, to point the boat towards the guide rod GR.

While the preferred embodiment of the invention has been illustrated, it will be understood that variations may be made by those skilled in the art without departing from the inventive concept. Accordingly, the invention is to be limited only by the scope of the following claims.

I claim:

1. Apparatus for automatically securing a boat equipped with an eyebolt at the bow thereof to a boat transporter type trailer comprising:

A. an elongated frame member having upper and lower ends and a central portion, said frame member being connectable to an eyebolt in the bow of a boat by a removable bolt connected to said central portion and passing through said eyebolt, and said frame member further including (i) a pair of Y-shaped members attached respectively to said ends and extending to engage said bow; (ii) a bracket connected to and extending longitudinally from said lower end and including at an end thereof a transversely extending rod receiving socket; and (iii) a second bracket connected to and extending longitudinally from said upper end and including at an end thereof a transversely oriented rod journal bearing;

B. an elongated rod member slidably positioned in said rod journal bearing and having upper and lower ends, a handle means on said rod member upper end, and a locking means element on said rod member lower end; and C. a rod receiver member connectable to the forward end of a trailer and including a base portion, a pair of spaced apart, longitudinally extending brackets defining therebetween a rod receiving pocket, and having end portions flared in opposite senses so as to define a relatively wide rod receiving yoke, and a latch member pivotally mounted on one of said flared end portions, said latch member being spring biased to a first position whereat it straddles said spaced apart brackets, and said latch member being rotatably displaced by said rod member to permit said rod member to enter into said pocket following which said latch member is spring biased back to said first position thereby capturing said rod member in said pocket.

2. Apparatus for automatically securing a water buoyed boat equipped with an eyebolt at the bow thereof to a boat transporter type trailer positioned partially in the water and having a forward end out of the water, said apparatus comprising:

A. an elongated frame member having a pair of spaced apart portions joined at upper and lower ends thereof and a central portion, said frame member being connectable to an eyebolt in the bow of a boat by a removable means connected to said central portion and passing through said eye bolt, and said frame member further including (i) a pair of Y-shaped members attached respectively to said ends and extending to engage said bow; (ii) a bracket connected to and extending longitudinally from said lower end and including at an end thereof a transversely extending rod receiving socket; and (iii) a second bracket connected to and extending longitudinally from said upper end and including at an end thereof a transversely oriented rod journal means;

B. an elongated rod member slidably positioned in said rod journal means and having upper and lower ends, a handle means on said rod member upper end, and a locking means element on said rod member lower end; and C. a rod receiver member connectable to the forward end of the trailer and including a base portion, a pair of spaced apart longitudinally extending brackets defining therebetween a rod receiving pocket and having end portions flared in opposite senses so as to define a relatively wide rod receiving yoke, and a latch member pivotally mounted on one of said flared end portions, said latch member being spring biased to a first position whereat it straddles said spaced apart brackets, and said latch member being rotatably displaced by said rod member to permit said rod member to enter into said pocket following which said latch member is spring biased back to said first position thereby capturing said rod member in said pocket.

3. The apparatus of claim 2 wherein each of said Y-shaped members has a stem portion connected at one end thereof to a pair of diverging legs, said stem portion being sized to fit between said pair of spaced-apart portions of said elongated frame member and said pair of diverging legs defining an included angle preselected to receive the forward facing surface of the bow of said boat.

4. The apparatus of claim 3 wherein said stem portions include adjustable means for connecting said stem portions to said frame member.

5. The apparatus of claim 2 wherein said elongated rod member has adjacent said upper end thereof abutment means and a compression spring means is positioned around said rod member and between said abutment means, and said rod journal means, said frame member being preselected in dimensions so that, when said locking means element on said rod member lower end is engaged with said rod receiving socket, said compression spring means is compressed to bias said rod member lower end into firm contact with said rod receiving socket.

6. Apparatus for automatically securing a water buoyed boat equipped with an eye bolt at the bow thereof to a boat transporter type trailer positioned partially in the water and having the forward end thereof out of the water, said apparatus comprising:

A. an elongated frame member having a pair of spaced-apart portions joined at upper and lower ends thereof and a central portion, said frame member being connectable to said bow by a removable means connected to said central portion and said eye bolt, and said frame member further including (i) a pair of Y-shaped members attached respectively to said ends and extending to be engageable with said bow; (ii) a bracket connected to and extending longitudinally from said lower end and including at an end thereof a transversely extending rod receiving socket; and (iii) a second bracket connected to and extending longitudinally from said upper end and including at an end thereof a transversely oriented rod journal means;

B. an elongated rod member slidably positioned in said rod journal means and having upper and lower ends, a handle means on said rod member upper end, and a locking means element on said rod member lower end, said rod member being positioned either in a down position whereat said locking means element is engaged with said rod receiving socket or in an up position whereat said locking means element is engaged with said rod journal means; and C. a rod receiver member connectable to the forward end of the trailer and including a base portion, a pair of spaced apart longitudinally extending brackets defining therebetween a rod receiving pocket and having end portions flared in opposite senses so as to define a relatively wide rod receiving yoke, and a latch member pivotally mounted on one of said flared end portions, said latch member being spring biased to a first position whereat it straddles said spaced apart brackets, and said latch member being rotatably displaced by contact therewith by said rod member to permit said rod member to enter into said pocket following which said latch member is spring biased back to said first position thereby capturing said rod member in said pocket.

7. The apparatus of claim 6 wherein said boat has a forward facing surface of said bow and each of said Y-shaped members has a stem portion connected at one end thereof to a pair of diverging legs, said stem portion being sized to fit between said pair of spaced-apart-portions of said elongated frame member and said pair of diverging legs defining an included angle preselected to receive the forward facing surface of the bow of said boat.

8. The apparatus of claim 7 wherein said stem portions include adjustable means for connecting said stem portions to said frame member.

9. The apparatus of claim 6 wherein said elongated rod member has adjacent said upper end thereof abutment means and a compression spring means is positioned around said rod member and between said abutment means and said rod journal means, said frame member being preselected in dimensions so that, when said locking means element on said rod member lower end is engaged with said rod receiving socket, said compression spring means is compressed to bias said rod member lower end into firm contact with said rod receiving socket.

10. The apparatus of claim 6 further characterized by said rod receiving socket including means for locking thereto said locking means element and by said rod journal means including means for locking thereto said locking means element.

\* \* \* \* \*